(12) United States Patent
Sendo et al.

(10) Patent No.: US 6,970,852 B1
(45) Date of Patent: Nov. 29, 2005

(54) METHODS AND APPARATUS FOR CONDUCTING SECURE, ONLINE MONETARY TRANSACTIONS

(75) Inventors: Mark R. Sendo, Ann Arbor, MI (US); Ryan S. Sherman, Royal Oak, MI (US); John C. Kaltwasser, Ann Arbor, MI (US)

(73) Assignee: imX Solutions, Inc., Royal Oak, MI (US)

( * ) Notice: Subject to any disclaimer, the term of this patent is extended or adjusted under 35 U.S.C. 154(b) by 0 days.

(21) Appl. No.: 09/560,603

(22) Filed: Apr. 28, 2000

Related U.S. Application Data

(60) Provisional application No. 60/131,369, filed on Apr. 28, 1999.

(51) Int. Cl.[7] ............................................. G06T 17/60
(52) U.S. Cl. .............................. 705/67; 705/1; 705/64; 705/65; 705/66; 713/201; 395/186; 380/255
(58) Field of Search .......................... 705/1, 67, 64–66; 713/201; 395/186; 380/255

(56) References Cited

U.S. PATENT DOCUMENTS

| | | | | |
|---|---|---|---|---|
| 5,511,121 A | * | 4/1996 | Yacobi ........................ | 705/69 |
| 5,671,279 A | | 9/1997 | Elgamal ....................... | 380/23 |
| 5,729,594 A | | 3/1998 | Klingman ................ | 379/93.12 |
| 5,870,473 A | | 2/1999 | Boesch et al. ................ | 580/21 |
| 5,883,810 A | * | 3/1999 | Franklin et al. ............ | 700/232 |
| 5,978,840 A | * | 11/1999 | Nguyen et al. ............. | 709/217 |
| 5,996,076 A | * | 11/1999 | Rowney et al. ............. | 713/201 |
| 6,341,273 B1 | * | 1/2002 | Briscoe ........................ | 705/41 |

OTHER PUBLICATIONS www.paybond.com/PAYBOND 2003.*

* cited by examiner

*Primary Examiner*—James P. Trammell
*Assistant Examiner*—John Winter
(74) *Attorney, Agent, or Firm*—Chadbourne & Parke

(57) ABSTRACT

A system, method, and apparatus for conducting secure monetary transactions over a communications network is provided. The invention facilitates secure monetary and financial transactions over the Internet and other public networks for various purposes, including automated payments associated with purchasing goods or services online. Different implementation methods may be utilized, including systems based on proxy and psuedo-credit-card models. In each case, communications protocols are provided between a consumer, merchant web site, payment processor and a service provider, enabling online transactions to proceed in a secure manner. The invention utilizes a physical medium to provide consumers, merchants, and financial institutions with a secure system to conduct electronic commerce transaction. The preferred medium assumes the form of a miniature recordable CD-ROM that contains cryptographic data representing one-time monetary and/or transactional details. The medium can be used in a standard CD-ROM drive of a personal computer system, and easily fits in a wallet. Consumers insert the medium into the CD-ROM drive, enter a personal identification number, and complete the transaction process.

7 Claims, 10 Drawing Sheets

US 6,970,852 B1

METHODS AND APPARATUS FOR CONDUCTING SECURE, ONLINE MONETARY TRANSACTIONS

REFERENCE TO PRIOR APPLICATIONS

This application claims priority of U.S. provisional application Ser. No. 60/131,369 filed Apr. 28, 1999, the entire contents of which are incorporated herein by reference.

FIELD OF THE INVENTION

The present invention relates generally to monetary transactions conducted over a communications network and, more particularly, to a system, method, and apparatus that provide a secure and portable payment method for online transactions.

BACKGROUND OF THE INVENTION

The Internet provides a forum in which consumers and merchants can engage in electronic shopping from globally diverse locations with absolute availability. The Internet continues to capture a growing share of retail business, as evidenced by the tremendous increase in online business-to-consumer transactions over the past several years.

Along with this growth, however, comes a demand by consumers for secure online payment methods. Most online businesses only accept credit cards for payment, and so the sensitive financial and personal data contained on a credit card is broadcast over the Internet; i.e., through multiple computer systems providing the means to read or capture the data. For this reason, prospective online purchasers remain reluctant to provide credit card information via the Internet, thus risking interception of the data for exploitative and criminal purposes by hackers.

Some have attempted to address these issues with various inventions intended to secure the financial and monetary data relevant to the transactions. In general, three categorical approaches to security exist: encryption of the data, utilization of a single, authenticated channel for the transaction, or utilization of proprietary hardware devices.

The first category, encrypted data, traditionally involves encoding the data themselves prior to transmission across a public communications network, and decoding the data when the transmission completes. One such scheme, private key, depends on a single secret known only to the consumer and the merchant. Another scheme, public key, publishes one key and maintains another key as confidential. The requirement in each scheme for a unique key for each user results in literally millions of encryption keys, and, therefore, a great potential for lost, stolen, or counterfeit keys increases.

The greater the degree of security that a particular encryption algorithm provides, however, the greater the degree of the processing effort and resource utilization is required to complete the transaction. Conversely, protocol requiring minimal security is quite susceptible to decoding by a hacker. In general, all encryption carries the potential for a hacker to break the code, and the more extensive the use of the protocol, the more the opportunity for the hacker to observe the patterns of the encryption and decode the algorithm. Thus, various encryption protocols maintain the security of the data only for until such a time as a hacker breaks the code.

Some encryption methods use a combination of networks to complete a transaction. First, the method transmits the encrypted data over a public network for portions of the transaction associated with a low security risk, then shifts the data to a private network to perform portions of the transaction with very high potentials of security failure. Of course, this method restricts purchases to those merchants associated with the provider of the private network. Similarly, Internet transactions involving the electronic withdrawal of funds from a bank account for online payment also require a third-party gatekeeper to route the consumer's payment information over a private network to the financial institution, send the encrypted payment information on a second private network to the merchant, and then divert data pertaining to the remainder of the transaction to the consumer via the Internet. Alternatively, a security method may combine use of a packetized network, such as the Internet, and a switched network, such as the telephone network for voice transmission. U.S. Pat. No. 5,729,594 to Klingman discloses such a method.

Although these combined security methods decrease the risk of infiltration, they restrict the online shopping opportunities for the consumer to those online banks and merchants available via the gatekeeper. In addition, the costs associated with utilizing both private and public networks in combination greatly increase the cost of the online transactional business.

The second category of security involves the configuration of a personal computer system of a consumer and a computer system of a merchant with proprietary hardware devices that cooperate to encode and decode the data for transmittal over the Internet. The smart card, a small plastic card encoded with various data, is a primary example of this technology. The Smart card provides a means by which the consumer can easily transport the card; however, current configurations require the use of a propriety smart card reader device attached to the personal computer of the consumer. U.S. Pat. No. 5,870,473 to Boesch, et al. discloses an example of this method. This method of security generally requires, at a minimum, a proprietary card reader by all consumers and all merchants using a particular card. These devices are costly, system dependent, and non-mobile, and the dependency on the propriety hardware restricts opportunities for transactions to those consumers and merchants with the appropriate, propriety hardware.

The third category of security involves transfer protocol security. Generally, this method incorporates adherence to a protocol directed at one or more logical layers of transport in a networking conceptual model. Usually, the personal credit card data in an online transaction must be encapsulated with computer-readable instructions to transport the data from one location to another; e.g., from application software to application software; from a diskette to a hard drive; or from a personal computer to a merchant's web site. For example, Secure Socket Layer (SSL) protocol utilizes data encryption of the information related to the channel of transmission; i.e., the transmittal information used to encapsulate the personal financial data themselves. This method of security also provides data authentication via digital certificates that offer the consumer and the merchant assurances that they actually are who they claim to be online, and that the data sent between the two is secure.

Alternatively, the security method may employ the security mechanism at any logical layer in a networking model. For example, the U.S. Pat. No. 5,671,279 discloses a security method utilizing a secure connection in the Transmission Control Protocol (TCP) layer of the Open Systems Interconnection (OSI) layered architecture networking model, as developed by the International Standards Organization (ISO) of the current International Telephony Union (ITU). The data encryption portions of this method, however, remain susceptible to breaches of security for all the reasons previously stated. Digitally signed certificates require the involvement of a third-party, the issuer or guarantor of the certificate, and, therefore, build in an additional cost for security.

Summarizing, the current art provides a level of basic security for Internet financial transactions in the form of data encryption. This method, however, does not provide perfect protection against infiltration. Furthermore, the likelihood of infiltration increases over time with any particular encryption algorithm due to the accessibility of the encrypted data to the public. Attempts to buttress security by utilizing third-party services and resources results in excessive costs to the merchant, the consumers, or both. As an additional factor, the combination of security methods often substantially restricts the transactional opportunities of the consumer and the merchant. Some of the methods currently available require significant system resources, resulting in excessive costs to the transacting parties and performance degradation on the systems involved.

From the foregoing, it can be seen that a secure, simple, and cost-effective method for conducting online monetary transactions is needed to keep pace with the ever expanding Internet and the associated transactional opportunities. An advantageous means to this end must provide a highly secure, robust, universal, and cost-effective solution to conduct high-speed transactions over the Internet from virtually any location.

SUMMARY OF THE INVENTION

The present invention provides a system, method and apparatus for conducting secure monetary and financial transactions over the Internet and other public networks. The approach may be used for various purposes, including automated payments for purchasing goods or services online.

In a preferred embodiment, the system comprises a physical medium containing a series of one-time-use data tokens, each token being representative of a monetary value or transaction. The medium is provided in the form of a computer-readable, wallet-sized card, with the tokens preferably being encoded optically, though they may be encoded magnetically, graphically or any combination of the above. An authentication server (the "IMC" server), is used to verify the validity of individual media, and an accompanying protocol permits consumers, merchants, and payment processors to cooperatively authenticate users and initiate and complete payment transactions. The system and method accommodate multiple payment models, including business-to-business and business-to-consumer arrangements.

The primary function of the physical medium is to provide consumers with a secure and efficient way to conduct electronic commerce transactions. The miniature size of the medium permits the consumer to carry the medium in a wallet or purse, and the medium is suitable for use on almost any existing personal computer. When payment is required for an online transaction, the consumer simply inserts the medium into any standard, media-readable drive, which then reads the data embedded on the card. The invention enables transaction activities over a communications network at minimal cost, and operates independent of computer system platform, adaptable to the dynamics of the Internet and other public or private computer networks. The method also permits online monetary transactions to be completed in minimal time.

DETAILED DESCRIPTION OF THE INVENTION

Figure 1:
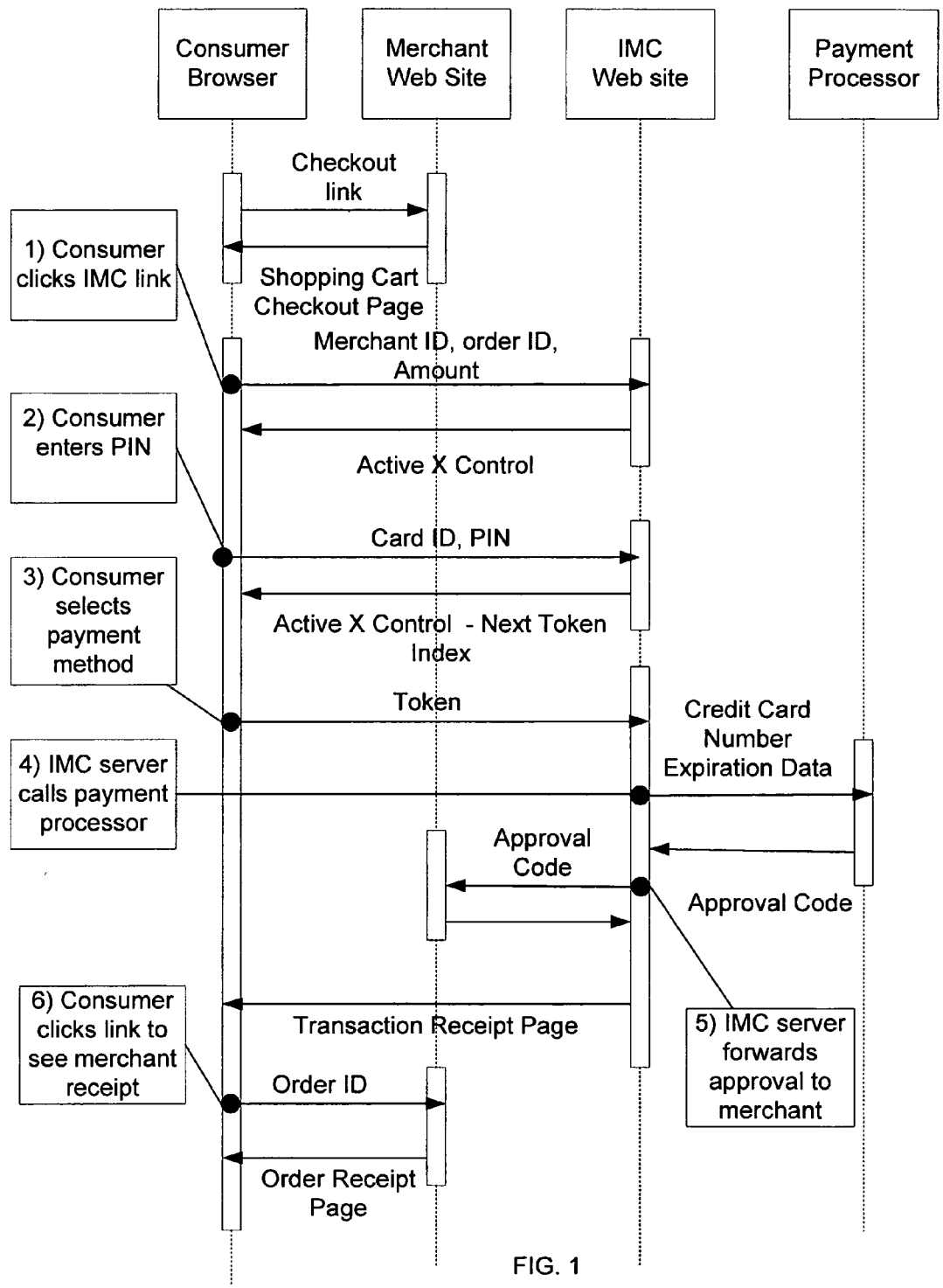
FIG. 1 is a state diagram which depicts the order of network calls in a proxy model embodiment of the invention.

This invention facilitates secure monetary and financial transactions over the Internet and other public networks for various purposes, including automated payments associated with purchasing goods or services online. Different implementation methods may be utilized, including systems based on proxy and psuedo-credit-card models. In each case, communications protocols are provided between a consumer, merchant web site, payment processor and a provider of the service (through an "IMC™ server"), enabling online transactions to proceed in a secure manner.

An important aspect of the invention is the successful integration of merchant Web sites. The system provides the merchant with a clear and easily implemented procedure based on a set of web-based software components enabling a physical medium to be used as a secure web based payment instrument. To provide the inventive payment option, a merchant team need only complete the following relatively simple tasks:

1) Modify the checkout page of their e-shopping cart so that it contains a small amount of script which, when downloaded to the consumer's browser, permits the selection of the inventive payment option.

2) Add a small amount of processing logic that will respond to each payment authorization. For many e-merchants this code is, for the most part, already written for the processing of conventional credit card transactions.

3) Register by completing the merchant activation form on the IMC server. Among other things, this establishes the types of payment processors that will be used for payment settlement.

Once the merchant has performed the above tasks, the e-shopping consumer will be presented with the IMC option at the checkout point. After the consumer chooses this payment option, a payment authentication page is downloaded, and this begins the payment session as described below. Once the payment session is complete, the merchant will receive notification from the IMC server, and will be ready to present the final confirmation (receipt) page to the consumer.

Software Components

The merchant has the choice of two methods for the integration of the inventive Payment Option. The easiest and fastest method is through a Link kit, and for the highest degree of customization an SDK option is available. The SDK option provides the most power and flexibility because the solution developed interacts directly with the an Authentication Service using the programming language of the developer's choice (i.e., Java, C/C++, or Perl).

The following sections discuss each software component used in the Payment Process. An important point to keep in mind is that whether the merchant is using Link or the SDK options, the same underlying components are used. The only difference is that for the Link option each component is configured and delivered through an automated interface on the IMC server, thus circumventing most of the programming issues that need tending while working directly with the SDK.

Consumer Browser "Checkout" Components

1. Payment Option.

The Payment Option consists of a small piece of HTML script that is added to the web store checkout page, and must be designed to provide the correct visual feedback and user input so that the consumer may select the inventive service over the conventional payment options. A standard logo for the service is strongly recommended, and may be required by the merchant. The SDK and Link options both contain this logo in a Gif and .Jpg format.

2. Payment Session Script

The Payment Session Script is a piece of HTML script that belongs on a page that will be presented once the consumer has selected the Payment Option. A primary function of this script is to direct the browser how to locate and initialize the Authentication Control, as described below.

3. Authentication Control

The Authentication Control is a software component that is downloaded to the consumer's PC and controls the Payment authentication and authorization process on the client machine. It is this component that directly reads the hardware device containing the physical medium and its security data. It also handles the communication of this sensitive data to the Authentication Service.

Depending on the targeted consumer browser, this control can take various forms. For example if the browser is Win32 ActiveX enabled, the Authentication Control is a signed ActiveX control. For other browsers, the control comes in the form of a Signed Java Applet or a Netscape Plug-In.

Merchant Server Components

1. Authorization Processing.

When an e-shopping consumer uses the physical medium to make a purchase at a merchant web-store, the IMC server generates what is called a payment authorization message. This message informs the merchant whether the transaction was successful. Authorization Processing refers to the work that must take place on the merchant's server in response to this Authorization Message. Typically, this will involve updating an order database to initiate a request for the delivery of the merchant's product or service; and in some cases, generating the consumer receipt page (or failure message in the case of a failed authorization). The merchant web store development team will use an API specifically developed to create the processing for incoming messages.

An Authorization Message can be delivered to the merchant in one of the following three basic ways: Email notification, Http post, or through a custom network protocol based on RPC. In most if not all web store implementations today, there already exists the processing necessary to handle incoming authorizations from a variety of sources. Essentially, the payment option according to the invention essentially provides yet another payment type that should be easily introduced into the mix. The composition of the Authorization Message can be modified through the Merchant Account Manager, which is a web based administration tool for use by the merchant web store development team. An Integration Guide is preferably provided to assist the merchant development team in creating the Authorization processing.

2. Merchant API

For the merchants who choose to use the SDK option, they will be writing code which makes use of a set of modules and library functions provided in the Merchant API. This API will permit the developer a central method from which to extract incoming messages from the IMC server and process them into the merchant database, as well as generate feedback for the e-shopping consumer.

iMC Server Components

1. Card Database

The database of the physical medium stores the data necessary to manage the vital functions of the inventive service. This includes tracking each card, consumer, merchant, and payment method as well as the consumer's shopping activity that includes each authorization request, whether the request was approved, and complete transaction history.

2. Authentication Service

The Authentication Service provides the communication components necessary to fully authenticate a physical medium. It is the server side counterpart that the Authentication Control must talk to. It forms the necessary hand shaking, IMC database access as well as communication with the Payment Processor for payment authorization and settlement.

3. Merchant Account Manager

The Merchant Account Manager provides web-based access to all aspects of a merchant's account. The functions provided include registration, setup and managing a merchant account. For example, it provides the merchant access to information that controls which payment processors and financial institutions the merchant's payment transactions will be used for electronic settlement.

4. Consumer Account Manager

The Merchant Account Manager provides web-based access to all aspects of a customer's account. The functions provided include registration, setup and managing a customer account.

Transaction Processing

At least two basic models are available for integration into existing payment processing systems. Merchants can chose the implementation that best integrates with their checkout experience. According to the first method, the provider of the inventive service inserts itself between the merchant and the payment processor, and acts as a proxy between the consumer and the payment processor and merchant. The software interacts with the consumer to authorize the transaction and, in the final stage where the software provides an authentication token, the IMC server not only verifies the token but continues to process the transaction by obtaining an authorization from a payment processor and forwarding the authorization code to the merchant.

In the second method, the provider of the inventive service operates in the periphery. The software in this case interacts with the consumer to authenticate a single transaction between the consumer and the merchant. It then generates a pseudo-credit card number that is submitted to the merchant to authorize the transaction. The merchant's software will forward the pseudo-credit card number to a payment processor as usual. The pseudo-credit credit card number is routed by the payment processor to the service provider to retrieve the consumers actual credit card number, expiration date, and billing address.

The Proxy Model

The proxy model is simple for the merchant to integrate into their Web site. It requires software modification on the part of the payment processors since it is implemented using their established APIs.

The state diagram in FIG. 1 depicts the order of network calls in the proxy model. Initially, the consumer begins by visiting the checkout page of the merchant's Web site. From there, the following interactions and transactions take place:

1) The consumer selects the inventive payment option by clicking a link on the shopping cart page. This link is a link to the IMC Web server. It will pass as parameters the merchant id, order id and amount. The IMC Web server creates a session record to store the merchant id, order id and amount. The IMC Web server returns a page that contains an Active X control or signed Java applet. It will also contain a form in which the consumer will enter their PIN number 2) Once loaded, the Active X control reads the card id from the physical medium in the consumer's drive. It will prompt the consumer to insert the card if there is no card available. The consumer will also enter their Personal Identification Number. When the consumer submits the PIN form, both the consumer's PIN and the card ID are posted to the IMC server. The IMC Web server verifies that the consumer has provided the correct PIN for the Card ID. It stores the Card ID in the session record. It then returns a page that contains an Active X control or signed Java applet that reads the next token in the series of tokens that is the one-time pad. The page also preferably uses a form to prompt the consumer to select one of the payment types available to them.

3) The Active X control reads the next token off the one time pad from the medium in the consumer's drive. The consumer will select a payment method. When the user submits the payment method form, both the selected payment method and the next token from the one time pad will be posted to the IMC Web server.

The IMC Web server will verify that the token is indeed the next token in the one time pad. At this point, the service provider has all of the information necessary for transaction processing stored in the session record. Before control returns to the browser, the IMC server will process the transaction for the consumer.

Using the Card ID, the IMC server queries the database for the information required to process the transaction for the consumers selected payment method. For example, in the case of a credit card payment method, this would be the card number, expiration date, and billing address. This information has been provided by the consumer at registration.

4) The IMC server will request an authorization from at payment processor. The payment processor will return an approval code that will specify whether the transaction has been authorized, and if not the reason why. If the transaction is not approved the IMC Web server returns a page informing the consumer of the rejection with a form that will allow the consumer to select a different payment method.

5) When the transaction is approved, the IMC server will inform the merchant of the approval. It will do this by posting a message to a CGI script running on the merchant's Web server. The message will contain the order ID that has been stored in the session record along with the approval code returned from the authorization call to the payment processor. If the post to the merchant fails for some reason, the message will be queued for subsequent attempts at posting, the network administrators will be paged, and the IMC Web server will return a page that will inform the consumer that their transaction has been approved, but the merchant has not yet been notified of the approval.

6) After a successful post, the IMC Web server returns a page informing the consumer that their transaction was successful. This page contains a link to a script on the merchant's Web site that will generate a detailed order receipt. The link will pass the order ID as a parameter to the receipt script.

To integrate the service, the merchant will create a link on their checkout page that will be labeled in accordance with the inventive payment option. The link will pass the order ID, merchant id, and amount to the IMC Web server. The merchant's checkout page will have to dynamically change this link for each order. Once the transaction has been approved, the IMC server will post the approval code with the order ID to the merchant's Web server. The merchant will have to create a CGI script that will receive the order ID and approval code from the service provider.

Pseudo Credit Card Model

With the pseudo-credit model, the merchant has to do even less modification to their existing software base. After the IMC server performs the token-based authentication, it generates a pseudo-credit card number that is returned to the consumer's Web browser in a form. This form posts to the merchant's existing order processing script where it is treated like an ordinary credit card submission and forwarded to a payment processor. The payment processor then contacts IMC to exchange the pseudo-credit card number for the consumer's actual credit card number.

If the credit card number itself is not large enough to uniquely identify transactions even when combined with a merchant ID, other fields that are commonly used in credit card transactions can be used to provide the necessary bandwidth. The billing address fields are candidates for the additional space.

Figure 2:
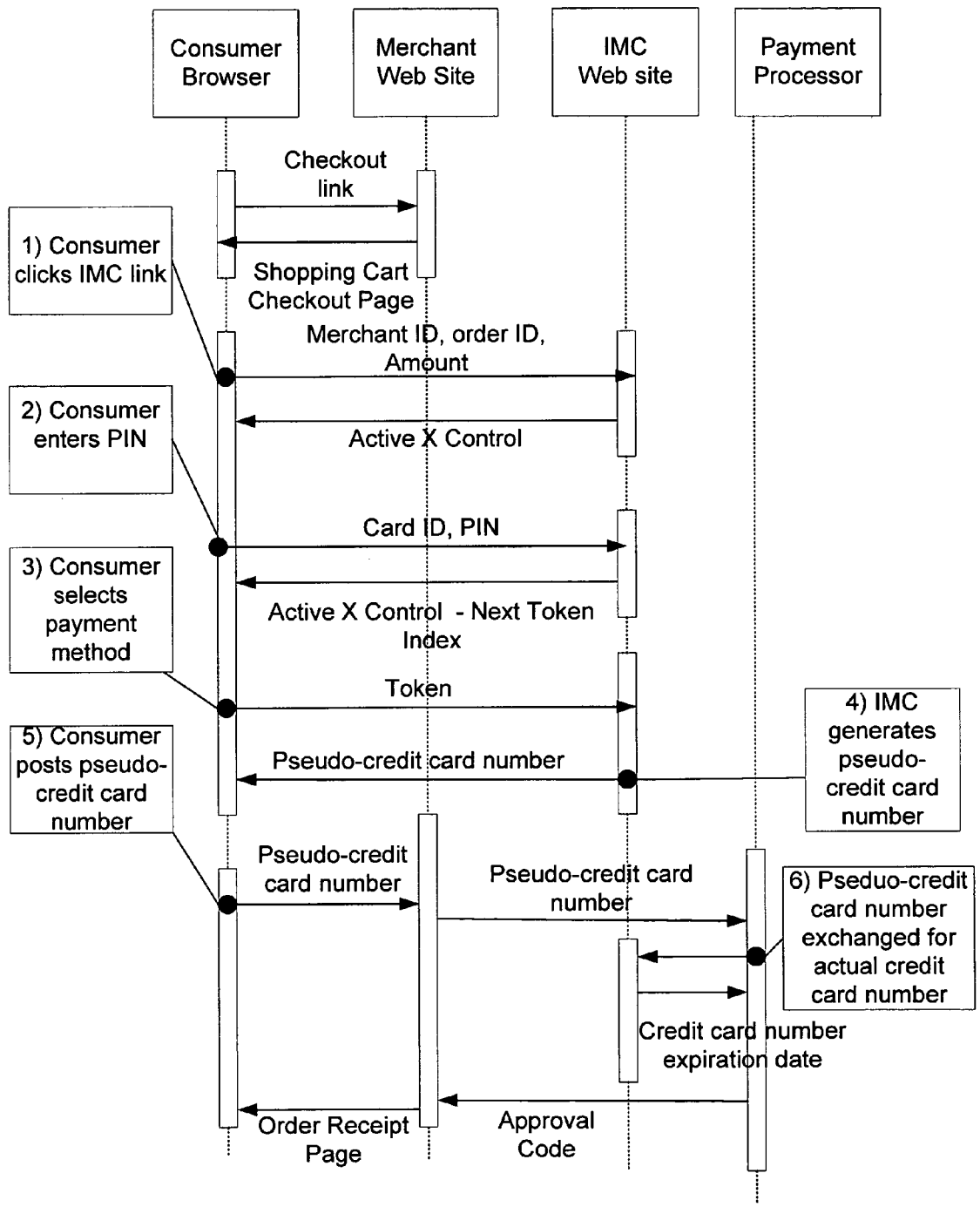
FIG. 2 is a state diagram which depicts the order of network calls in a pseudo credit card embodiment of the invention.

The state diagram in FIG. 2 illustrates the pseudo-credit card model. The network traffic is identical to the proxy model until the consumer submits their payment method choice.

The IMC Web server receives the next token off the one time pad and the payment type. It verifies that the token is indeed the next token in the one time pad. The payment method is stored in the session record.

The IMC Web server generates a unique identifier for this transaction. The unique identifier will be associated with the session data that has been stored in the session record. The unique identifier is retuned in hidden fields in a form to the consumers browser.

When the consumer submits the form, it posts the pseudo-credit card information to the merchant's order processing script. The merchant's order processing script processes the form submission by forwarding the pseudo-credit card information to the payment processor.

The payment processor identifies the pseudo-credit card information as originating from the service provider. It forwards the pseudo-credit card information to the IMC server. The IMC server retrieves the session record associated with the unique identifier encapsulated in the pseudo-credit card information. The IMC server returns to the payment processor the actual credit card number, expiration date, and billing address for the payment method that the consumer selected. The payment processor authorizes the transaction and returns an approval code to the merchant. The merchant stores the approval code and begins order fulfillment. It returns a page containing a detailed receipt to the consumer's Web browser. If the approval code indicates that the transaction has been denied, the merchant returns a Web page informing the consumer of the denial.

Database Schema

Figure 3:
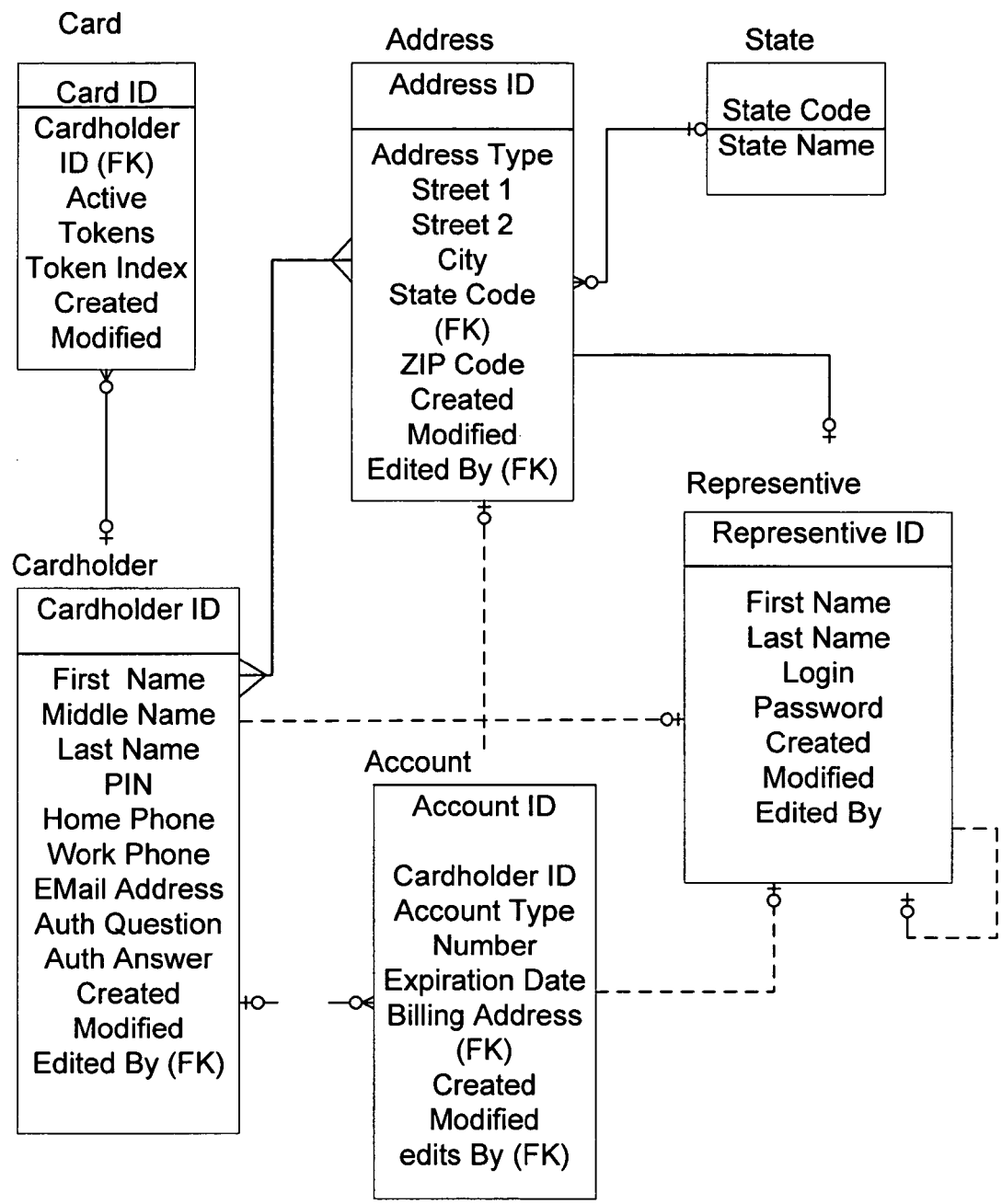
FIG. 3 is a card holder ERD view.
Figure 4:
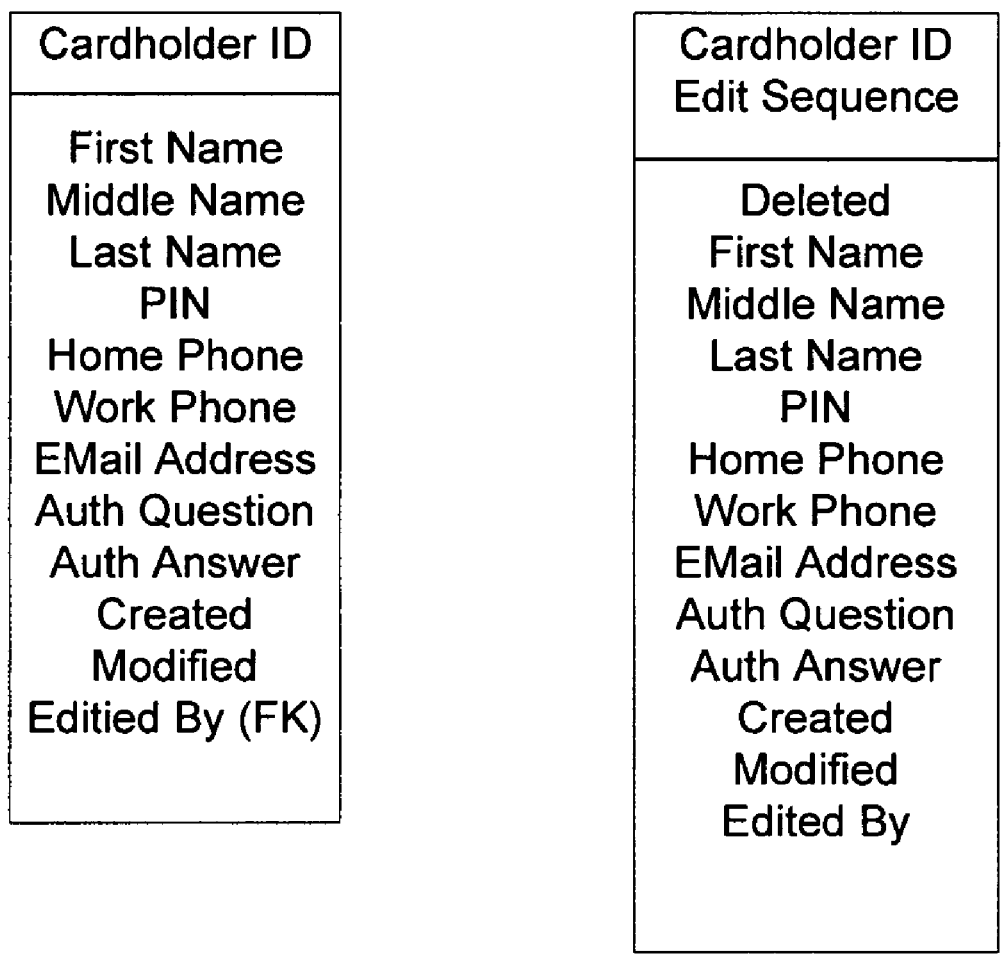
FIG. 4 is a history ERD view.
Figure 5:
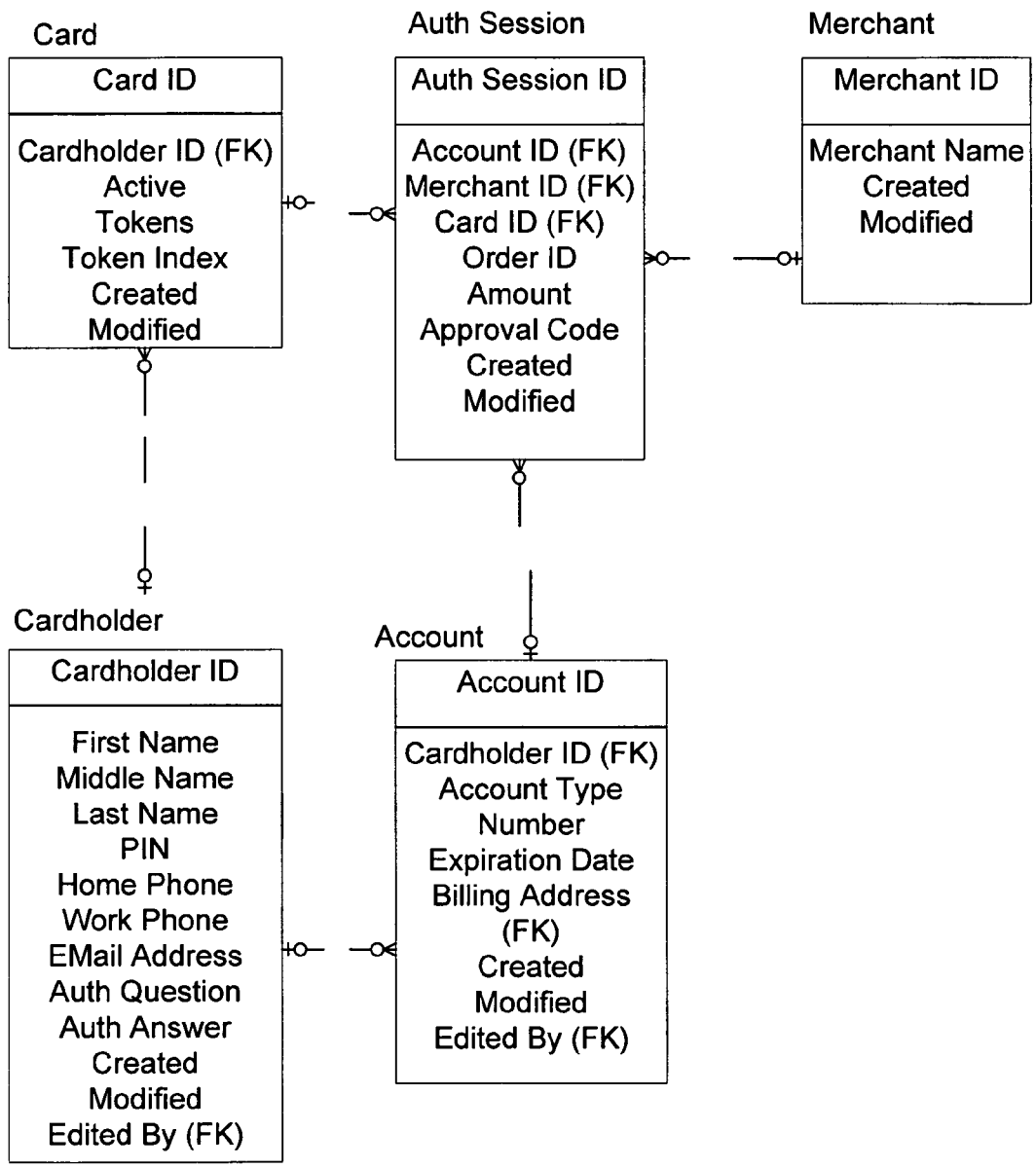
FIG. 5 is a session ERD view.
Figure 6:
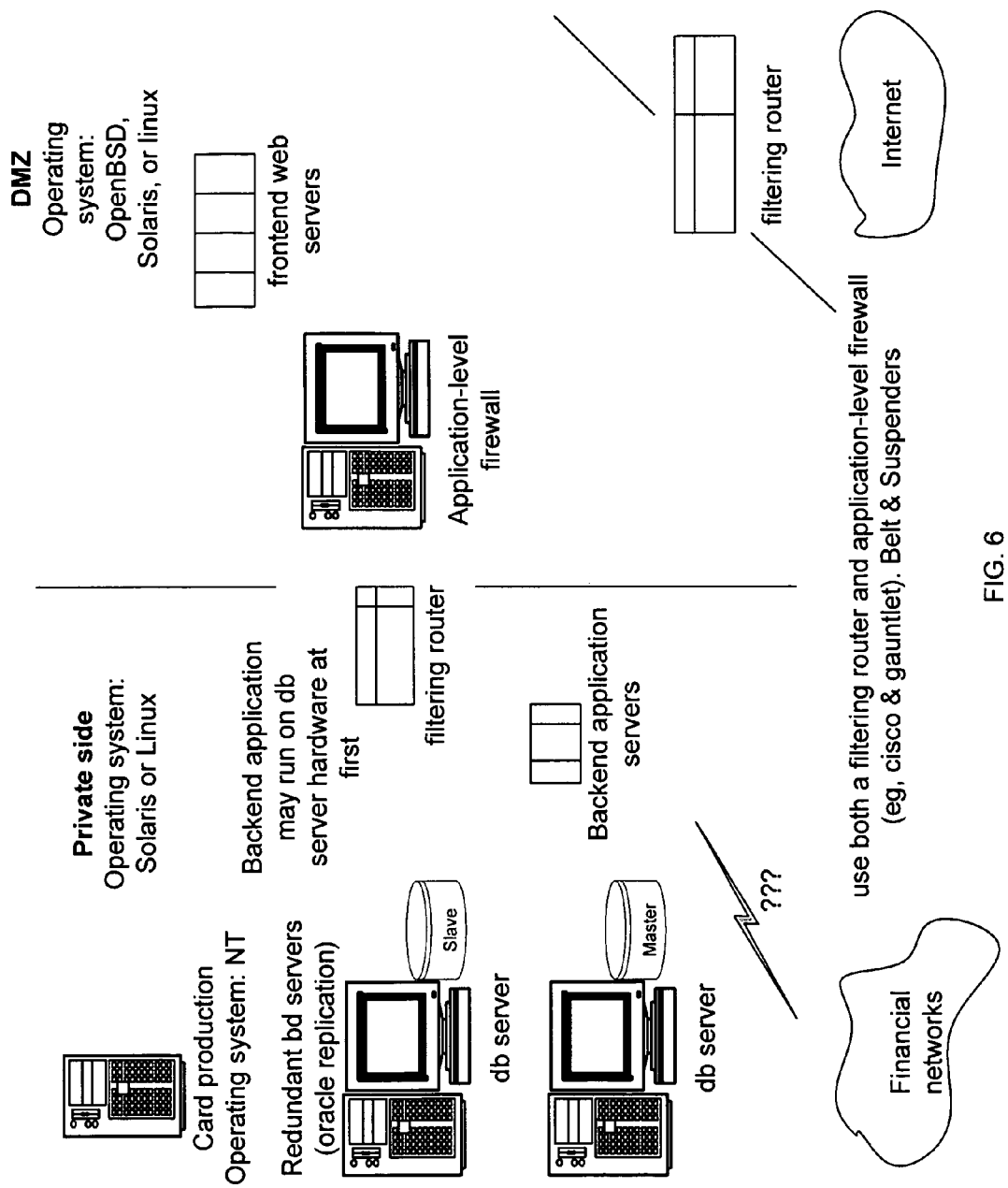
FIG. 6 is a preferred network architecture according to the invention.

The following will detail the database schema for the IMC database by dividing the ERD into two components. One of the major tasks of the IMC database is to store cardholder information, including account information. The cardholder view of the ERD in FIG. 3 depicts the entities and relationships that together form the cardholder model. This information will be updated by the cardholder through a Web interface when the visit the IMC Web site. It will also be edited by customer service representatives in response to a cardholder inquiry, or by data entry personnel.

The cardholder view of the ERD contains a separate entity for addresses. Entities that would otherwise duplicate address fields in their own definition instead have a many to many, or many to one relationship with the address entity. The address entity is used by merchant and account entities, for example.

The card entity represents a physical medium according to the invention, and stores the tokens and the index of the next valid token. From the card entity, one can derive the cardholder and a list of accounts that can be used to make purchases.

Entities that will be modified over time by the cardholder and customer service representatives will have those modifications tracked by the database. It will be possible for customer representatives to determine when a cardholder's information was last modified, how it was modified and by whom.

The address, cardholder and account entities all contain the field "edited by" which contains the representative id of the last representative to edit the record, or no value if the cardholder last edited the record. Both the "edited by" and the "modified" fields are updated each time the entity updated.

All changes made to these tables will be recorded in history tables. This will allow customer representatives to view the changes made to a cardholder's account information over time. The representative will be able to roll back erroneous modifications to the cardholder's data.

For each entity whose change history is tracked there will be a history table that contains the same fields as the entity with an additional field in the key to denote the sequence of the edit, and an additional non-identifying field to indicate whether or not the entity has been deleted.

The IMC database must also store the information required to authenticate a transaction. Each time a consumer attempts to authenticate a transaction an authorization session record is created. As information is sent from the consumer's Web browser, that information is stored in the session record.

In the pseudo-credit card model, the authorization session entity is uniquely identified by the pseudo-credit card number. When the payment processor receives the pseudo-credit card number, it will retrieve the actual credit-card information from the IMC server. The IMC server will obtain this information by referring to the authorization session record. Once the transaction associated authorization session has been completed, the authorization session entity becomes a record of the transaction. Physically the transactions may be stored in a different table.

Systems Architecture

The invention preferably uses state-of-the-art, redundant, secure computing and networking systems, along with high-quality, stable, secure operating systems, redundant hardware and networking, and advanced Internet security technology. In all cases, redundancy will be used to enhance reliability. For instance, Oracle database replication will preferably be used to keep a hot backup of the production database server, multiple web servers with load-sharing and monitoring software (e.g., Resonate), RAID instead of individual disks, etc. Sun's Solaris is preferred as the primary operating system. Solaris is very stable, performs well, is well-understood, and can be made highly secure. For certain applications, OpenBSD or FreeBSD may be used, depending upon their state of development.

The networking infrastructure will preferably use Cisco routers. For Internet security, we will use the security features of the Cisco routers, as well as application-level firewalls (Network Associates Gauntlet or Checkpoint Firewall-1). Our database servers containing confidential consumer information will be protected behind multiple filtering routers and firewalls, and will be running on secure operating systems. This approach of using multiple, complementary methods for system security assures a high level of security. The Internet connection will preferably have Cisco filtering rules, such that only necessary traffic is allowed through, packets are checked for appropriate source & destination, broadcast echo requests are disallowed, etc.

Behind this Cisco will sit the "DMZ" (de-militarized zone), which will contain the web servers that need direct connections to the Internet: the front-end servers which serve consumer content, and the merchant connectivity servers which contact merchants to note payment authorization (under one potential protocol design). Connecting the DMZ to the "Private side" will be a pair of systems, to provide redundant security—if one fails, we have the other. First, there will be an application-level firewall such as Gauntlet or Checkpoint, which can perform active checks on the data being passed through to the other side. Next will be another Cisco router with a more-restrictive filter list.

Availability is also a major concern. Consumers will want to be able to use their physical media at any time of the day or night. Multiple physical sites will therefore preferably be used, including multiple database servers, firewalls, and network hardware, and high-availability and load-balancing software on the front-end web site.

Physical Media Production

Figure 7:
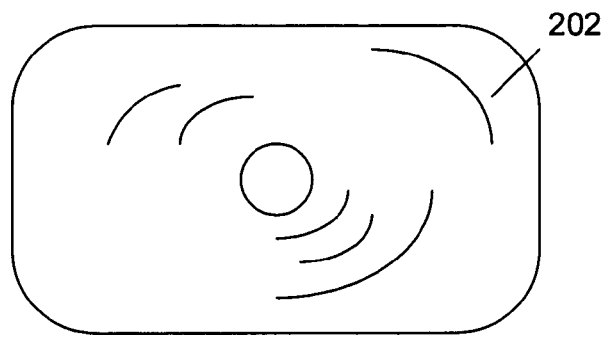
FIG. 7 is a drawing which depicts a preferred physical medium.

The physical medium preferably takes the form of a small, easily transportable card with variable dimensions for use with any standard device drive capable of reading and writing data to and from computer-readable media. A preferred physical medium according to the invention is a recordable CD-ROM card having the size and form of a creditor business card, as shown in FIG. 7. Such media can currently hold 20 Mbytes of data, though a larger form is now available which can hold around 50 Mbytes of data. The approximate dimensions of 2 inches by 4 inches by $\frac{1}{16}^{th}$ inch or less facilitate easy portability in a wallet. A full-size disk may also be used. Multicolored images are best imposed onto a card via a large volume silk-screen process. A card can be visually individualized with a black ribbon printer during the recording process. Individualization could include a unique name, serial number, or bar code. The data recorded into a card is unique and is obtained from a repository under control of the inventive service provider. Currently, a single robotic machine consisting of four CDR-drives and one black printer can produces 100 cards per hour.

One skilled in the art will recognize that the physical and functional design characteristics of the medium may be implemented in a variety of ways, so long as the implementation conforms to the functional requirements described herein. In addition, the card may be encoded on both sides, as technology permits, and information other than the use tokens described below may be encoded. For example, advertising or other information may be contained on the card, thereby at least partially offsetting the cost of manufacture and/or distribution.

Figure 8:
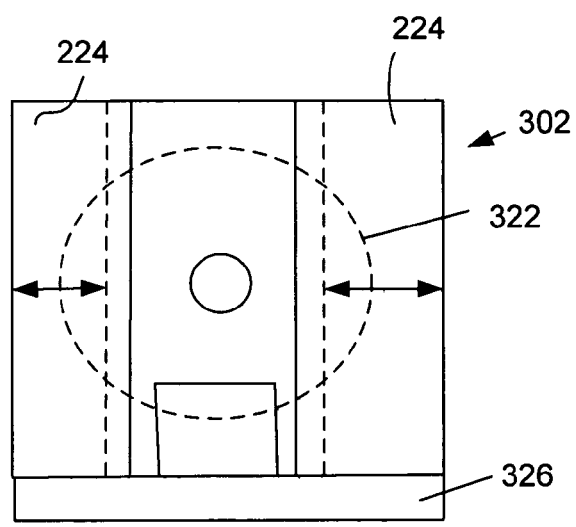
FIG. 8 depicts an alternative, magnetically encoded medium.

FIG. 8 shows an alternative medium in the form of an expandable magnetic medium 302. In this configuration, the expandable magnetic medium 302 in its collapsed state measures approximately 2 inches by 4 inches by $\frac{1}{16}^{th}$ inch, thereby permitting the consumer to easily transport the expandable medium 302 as one would a credit card. In its expanded state, however, the magnetic medium 302 approximates the dimensions of a standard 3.5-inch floppy diskette.

The expandable magnetic medium 302 is constructed from a durable plastic and metal combination housing an inner magnetic disk 322 shown in phantom lines for data storage. In the collapsed state, two protective outer sleeves 224 meet along an axis of the expandable magnetic disk, protecting the inner magnetic disk 322, and a third metal protective sleeve 326 located along a front edge of the magnetic expandable package to protect the inner magnetic disk 322.

Due to the reduced overall size of the expandable magnetic medium 302 in its collapsed state, the diameter of inner magnetic disk 322 is substantially less than the diameter of a magnetic disk of a standard 3.5 floppy diskette. For this reason, the data storage capacity of the expandable magnetic medium 322 is reduced, and the distance the inner magnetic disk 322 extends into the drive is reduced as well. To accommodate the aforementioned reductions, a file allocation table (FAT) located at the interior portion of the inner magnetic disk 322 instructs a read/write head of the drive to search areas on the inner magnetic disk 322 where data is stored. The read/write head reads the FAT instruction on initialization of the personal computer and the associated disk drive, and eliminates drive errors due to an absence of magnetic medium under the entire length of head track during read/write operations to the expandable magnetic medium 302.

To use the expandable medium, the consumer slides each outer sleeve along the length of the second protective metal sleeve 224 and away from the center of the expandable magnetic medium 302. The two protective outer sleeves 224 bring the overall width of the expandable magnetic disk 302 to 3.5 inches. The outer sleeves 224 snaps into place using a simple spring and groove system with track and groove similar to the protective portions found on a traditional 3.5-inch diskettes. Alternatively, the two outer sleeves 224 slide across a J-shaped groove track to lock into place. To collapse the expandable magnetic medium 302 to its smaller size, simply pull each outer sleeve 23 outward and away from the center of the expandable magnetic medium a fraction of an inch, and it snaps back to its reduced size using the J-grooves with a spring mechanism.

Figure 9:
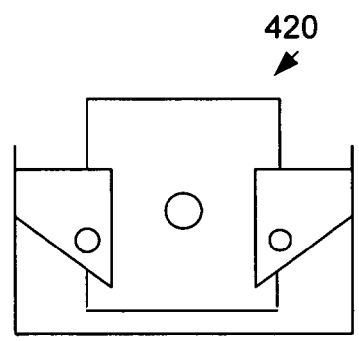
FIG. 9 shows a different magnetically encoded medium according to the invention.

One skilled in the art will recognize that multiple means for expansion and various design techniques are available in for this embodiment of the present invention. For example, a winged model 420 of the expandable medium shown in FIG. 9 replaces the outer sleeves 224 found in the expandable magnetic medium 302 a hinged wing on each side. The hinged wings affix with a standard rivet-style pin protruding through the expandable magnetic disk, and expand and collapse to provide dimensions appropriate for transportation and use of the winged model of FIG. 9.

In addition to the uses described above, the one-time data tokens may be cryptographically derived identifiers representing a monetary value, each of which may be used to authorize a single transaction. For example, a dollar may be represented on the medium as a coded multidigit alphanumeric number (hereinafter, an AN string). With each AN string utilizing 16 bytes of storage space, the 120,000 byte usable surface will store approximately 7500 AN strings, or the equivalent of $7500.00 per medium. A slightly enlarged version of the medium holds approximately 29,437 AN strings, or $29,437.

The remaining authentication data on the optic medium may be used to prevent the interception and unauthorized use of data tokens during reapplication of monetary value. If a consumer depletes the one-time data tokens on the optic medium, the consumer may apply more monetary value to the optic medium by consummating an online withdrawal from a bank or other authorized institution.

The transfer of the one-time data tokens in this case preferably employs a two-tier scheme to secure the one-time data tokens 528 while enroute to the medium. First, upon issuance of each medium, a two-digit code is encrypted and hidden thereon, and the authentication server stores the two-digit number along with a reference to the associated medium. Upon request for revaluation of the medium, the authentication server downloads a sequence of 12-digit, unique AN strings. After download, the hidden two-digit code is added to each AN string to make a 14-digit AN string. Second, the authentication server adds a two-digit code and one hundred random AN strings to the download data. The one hundred random AN strings mask the two-digit, preventing deciphering of the same.

Once the download completes, the two-digit code appends to each 14-digit AN string to complete the final 16-digit sequence necessary for a one-time data token. The authentication server records the complete 16-digit AN string by compiling all information pertaining to a 16-digit AN string from the authentication server information. Any attempt to intercept an AN string enroute to a consumer's personal computers results in, at best, the capture of a 12-digit, meaningless number. The inability to easily ascertain the two-digit code transferred with the AN strings coupled with an inability to ascertain the secret two-digit code hidden on each medium presents a robust, secure means to revaluate the same.

The encoded data may also include application data for marketing, promotional, and other purposes. It is anticipated that the device drive connected to the personal computer reads the medium and transfers the application data to personal computer of the consumer for display on the video display unit in the form of images, video and other multimedia means designed to capture the attention of the consumer. The application data typically includes the logo of the issuing institution of the optic medium, media-rich advertising in the form of video clips, sound bytes, and other means to target the consumer. For example, the consumer's personal computer interacts with the merchant's server to process a payment transaction; the personal computer may concurrently display an advertisement utilizing several media on the video display monitor.

It is anticipated that the various payment transaction models implemented for use with the present invention offer multiple methods to obtain and activate the medium. Some media are distributed in an immediately usable form, while others require consumer activation before use. In some case, a provision of a PIN number activates the medium, wherein the PIN number is known only to a consumer and an authentication server, and not encoded on the medium. In other cases, the activation requires the provision of a credit card or other valid payment instrument to associate with the medium itself. For example, the issuing bank preapproves consumers and the consumers requests the medium, the medium company provides media via a mass distribution scheme, or merchants offer retail stored-value cards. Each of these examples is discussed in detail below.

Figure 10:
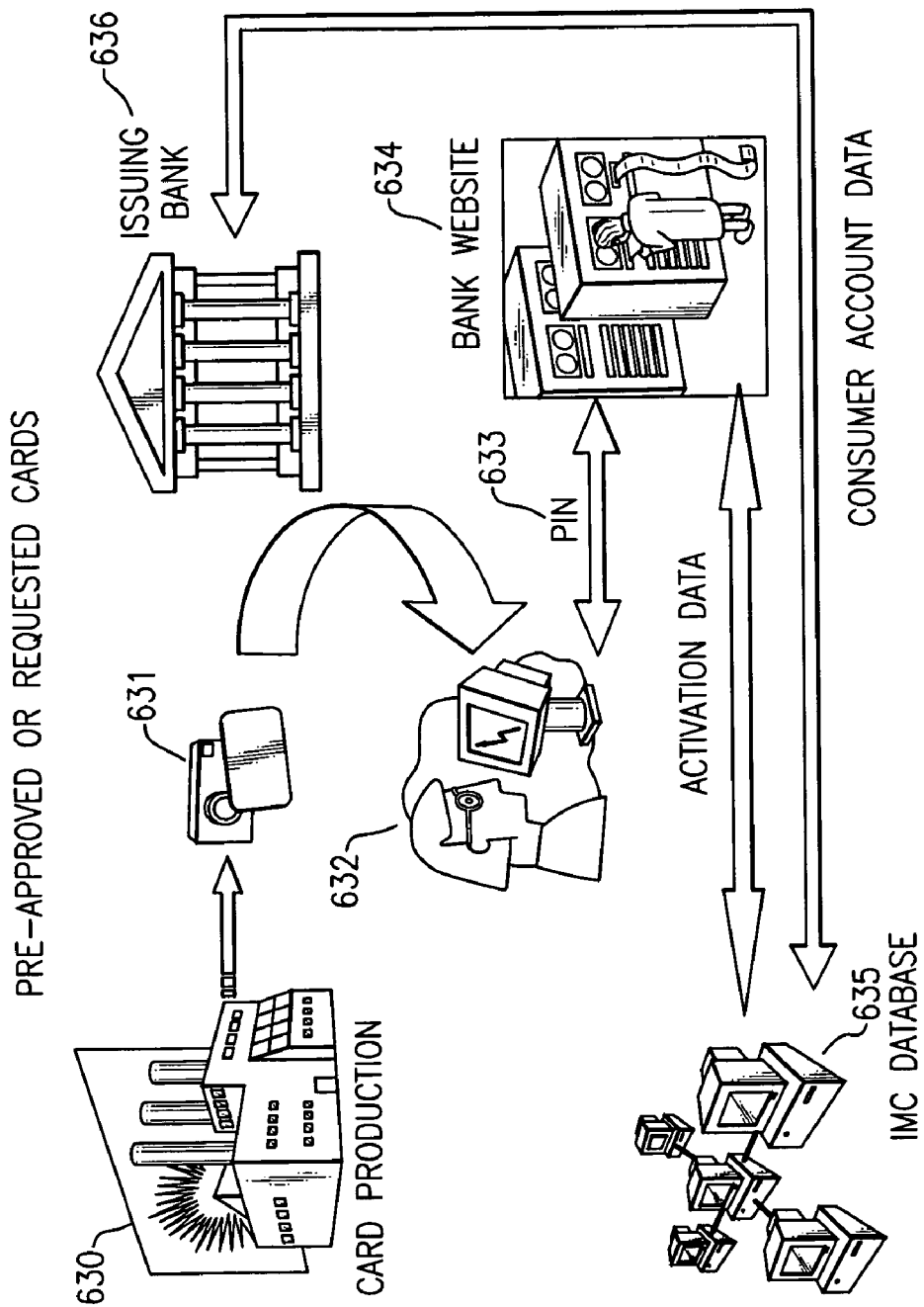
FIG. 10 is a diagram which shows a method for issuing providing and activating a physical medium according to the invention.

FIG. 10 depicts the events in one method for issuing, providing, and activating the medium. Initially, a source 630 produces the media 631 in volume, and ships a medium to a consumer 632 upon request. The consumer utilizes a personal computer and the medium 631 to logon to a bank website 634 and provide information about the medium 631. The bank website 634 issues a PIN number 633 for the consumer for validation purposes. The bank website also contacts the authentication server 635 and its associated network of servers to provide the consumer account data relevant to the medium and the consumer 632. The authentication server 635 and the associated network of servers add the PIN number to the information pertaining to that particular medium 631 already stored in its database. The authentication server 635 then contacts the issuing bank 636 to exchange consumer account data, at which time the activated card may be used by the consumer.

Figure 11:
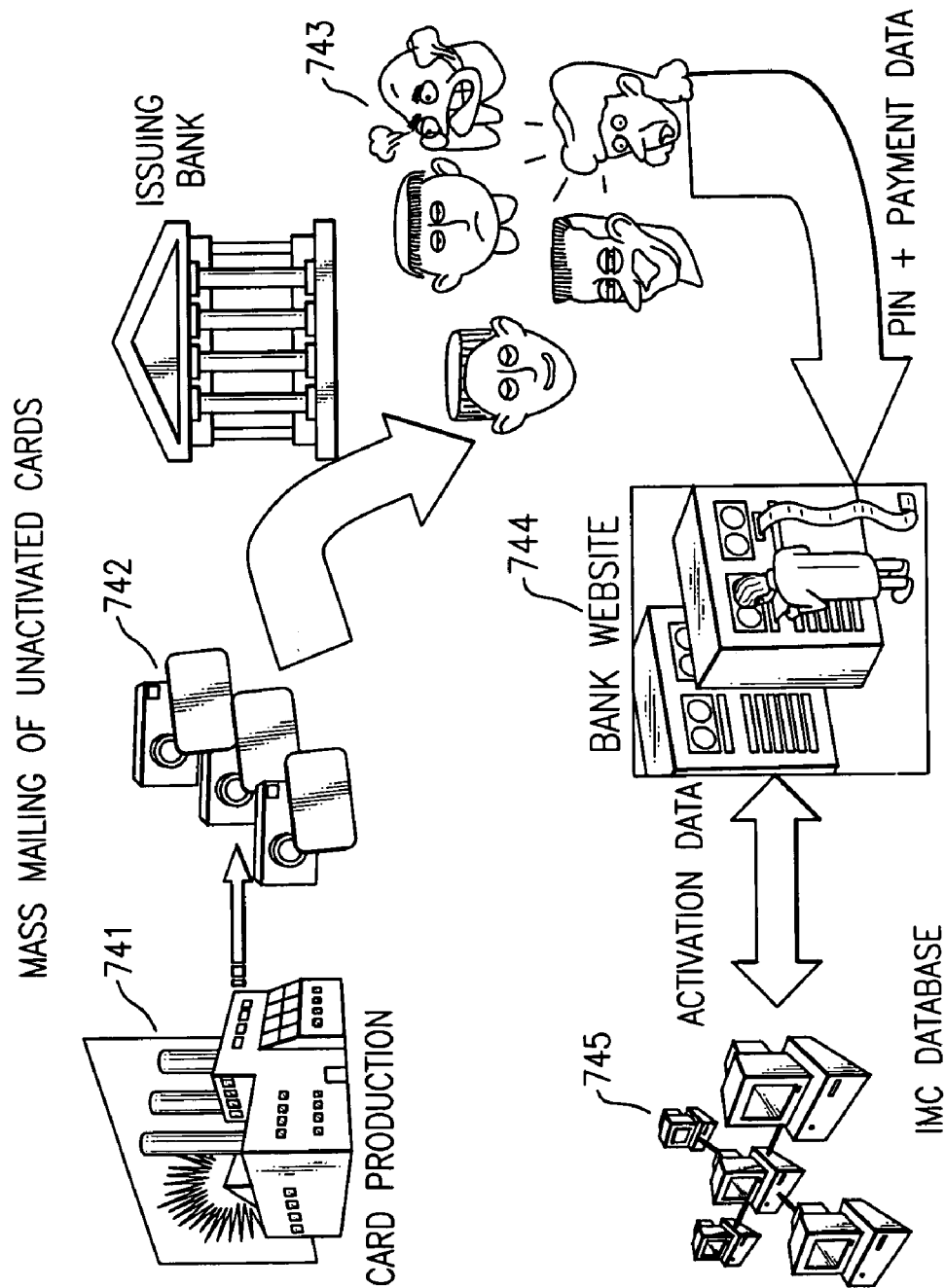
FIG. 11 is a diagram which depicts the events surrounding a mss distribution method for providing a medium to consumers.

FIG. 11 depicts the events surrounding a mass distribution method for providing media to consumers. Card production at a source 741 produces inactivated volumes of media 742 that are distributed to a population 743 of people via a predetermined plan and means. The distribution plan includes a provision for a separate distribution of unique PIN numbers, each corresponding to a medium 742 and each distributed via a separate channel from the medium 742 to prevent a breach of security.

Once the consumer receives both the medium 742 and the PIN number, the consumer uses a personal computer to access a website associated with the bank 744 of the consumer. The PIN number and payment data on the card are forwarded via secure means to the website, and on to the authentication server 745 and its associated network of servers for activation. The authentication server 745 routes the activation data through the website of the bank 744, at which time the consumer can use the medium for online payment transactions.

Figure 12:
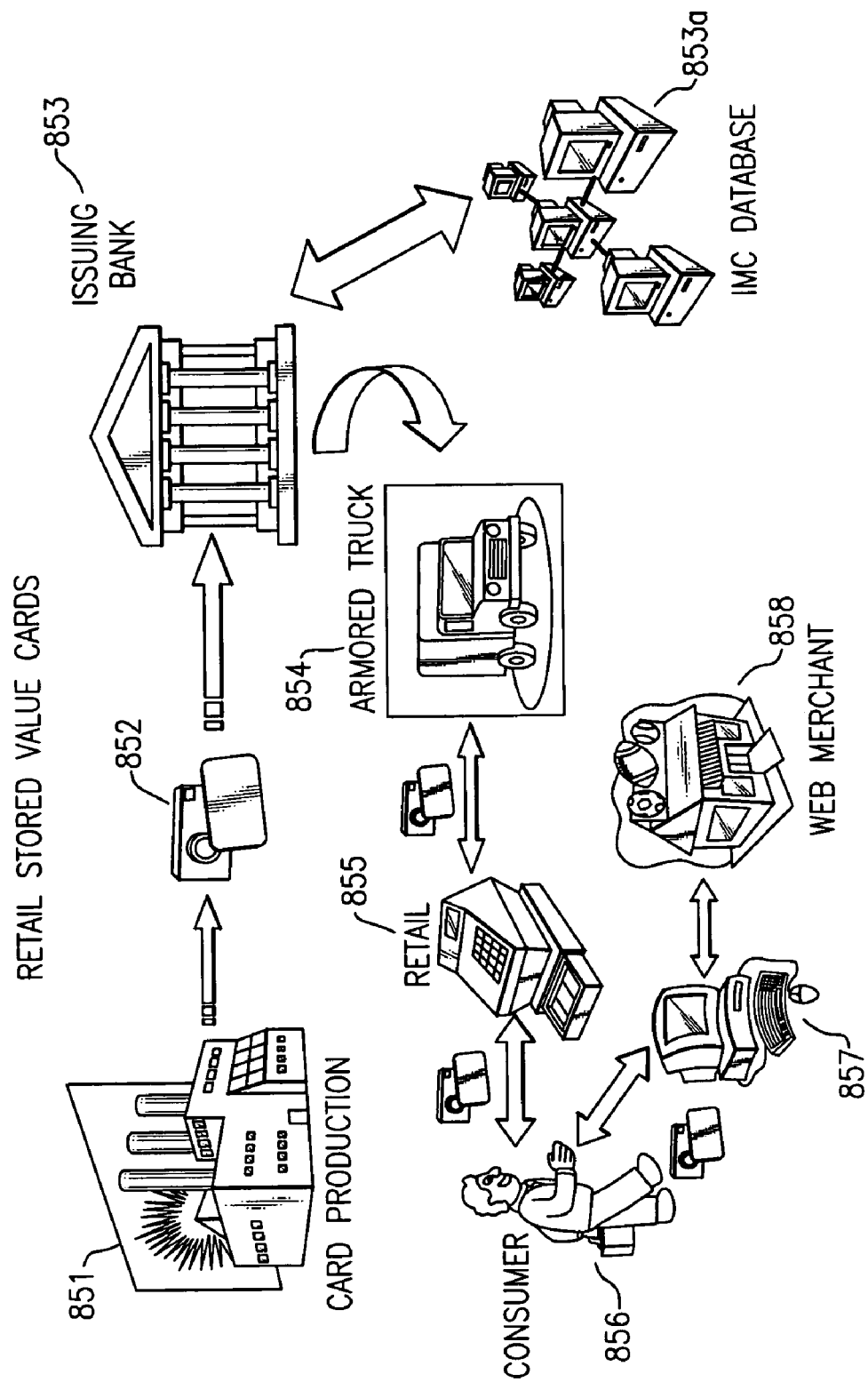
FIG. 12 is a diagram which depicts an alternative distribution and activation process.

FIG. 12 depicts a distribution and activation process whereby the source 851 produces and encodes media 852 complete with authentication data and a series of one-time data tokens; i.e., active and ready for use by a consumer. The production and encoding process is implemented according to a predetermined plan in conjunction with an issuing bank 853, whereupon the individual data associated with each medium is transmitted to an authentication server 853a and its associated network of servers. Once the media are produced, they are distributed via a secure method; e.g., armored truck 854 to a retail establishment 855. Upon purchase by a consumer 856 from the retail establishment 855, the consumer can immediately use the medium 852 in conjunction with a personal computer system 857 for online payment transactions with various websites 858 associated with various merchants.

Having illustrated and described the principles of the system, method, and apparatus of the present invention in various embodiments, it should be apparent to those skilled in the art that the embodiment can be modified in arrangement and detail without departing from such principles. For example, the physical manifestation of the medium may be changed if preferred. Therefore, the illustrated embodiments should be considered only as example of the invention and not as a limitation on its scope, which is defined by the following claims. We therefore claim as our invention all modifications and equivalents to the embodiment coming within the scope and spirit of these claims.

We claim:

1. A method of securely transferring data having a corresponding equivalent monetary value in a communications system including a first device having access to a removable recordable media having a first set of data encoded thereon, a second device having a second set of data thereon, a third device having a third set of data thereon, and a fourth device having a fourth set of data thereon, the method comprising the steps of:

sending a request from the first device to the second device to perform a transaction;

retrieving the first set of data from the recordable media at the first device wherein the first set of data includes at least one non-reusable token being equivalent to a monetary value;

transmitting the first set of data retrieved from the recordable media directly to the third device;

at the third device comparing the first set of data to the third set of data for verification purposes;

transmitting a portion of the third set of data to the fourth device;

comparing the portion of the third set of data to the fourth set of data at the fourth device for verification purposes;

upon verification by the fourth device transmitting an approval message from the fourth device to the third device; and upon receiving an approval message at the third device transmitting an instruction from the third device to the second device whereby the second device completes the transaction request according to a predetermined process.

2. A method as recited in claim 1, wherein the recordable media is a medium capable of storing data for retrieval by a disk drive.

3. A method as recited in claim 2 whereby the communications system is the Internet.

4. A recordable media according to claim 1, further comprising dimensions approximately the size of a credit card.

5. The method according to claim 1 wherein the recordable media is optically recordable.

6. The method according to claim 1 wherein the first device is a personal computer.

7. The method according to claim 1 further comprising invalidating at least one non-reusable token from the recordable media after verification.

* * * * *